United States Patent

[11] 3,558,887

| [72] | Inventors | Harald Hick;<br>Karl Rumpold, Vienna, Austria |
|---|---|---|
| [21] | Appl. No. | 680,460 |
| [22] | Filed | Nov. 3, 1967 |
| [45] | Patented | Jan. 26, 1971 |
| [73] | Assignee | Osterreichische Studiengesellschaft Fur Atomenergie Ges. M. B. H.<br>Vienna, Austria<br>a corporation of Austria |
| [32] | Priority | Nov. 4, 1966 |
| [33] | | Austria |
| [31] | | A 10237/66 |

[54] APPARATUS FOR MEASURING OF QUANTUM RADIATION
2 Claims, 2 Drawing Figs.

| [52] | U.S. Cl. | 250/83.3 |
|---|---|---|
| [51] | Int. Cl. | G01t 1/24 |
| [50] | Field of Search | 250/83.3, 71.5 |

[56] References Cited
UNITED STATES PATENTS

| 2,830,185 | 4/1958 | Scherbatskoy | 250/71.5 |
|---|---|---|---|
| 3,205,357 | 9/1965 | Lindsay | 250/83.3 |
| 3,320,419 | 5/1967 | Thomas et al. | 250/71.5 |

*Primary Examiner*—Ralph G. Nilson
*Assistant Examiner*—Davis L. Willis
*Attorney*—Ernest G. Montague ABSTRACT: An apparatus for measuring of quantum radiation, particularly of gamma radiation, which comprises a first detector for the primary radiation, and a second detector for the back scattering radiation. A coincidence circuit and a measuring device are also provided. The first and second detectors are connected with the measuring device by means of the coincidence circuit. Both detectors have a high resolving power in spite of a complicated response function, and an adding device is connected with the detectors and the output of the adding device is connected with the measuring device.

PATENTED JAN 26 1971

3,558,887

Inventors
Harald Peter Kirk
Karl Mumfeld
By Ernest Montague
attorney

APPARATUS FOR MEASURING OF QUANTUM RADIATION

The present invention relates to an apparatus for measuring of quantum radiation, in general, and of gamma radiation in particular, in which apparatus a detector for the primary radiation and a detector for the backscattering radiation are connected with a measuring device by means of a coincidence circuit.

It is one object of the present invention to provide an apparatus for measuring of quantum radiation wherein both detectors have a high resolving power, in spite of a complicated response function and are connected with an adding device, the output of which is connected with a measuring device. The response function is to be understood as the spectrum which produces a mono-energetic γ-source in the detector, also an absorption line on the basis of the photo effect, a Compton-continuum, lines by pair formation, etc.

Figure 1:
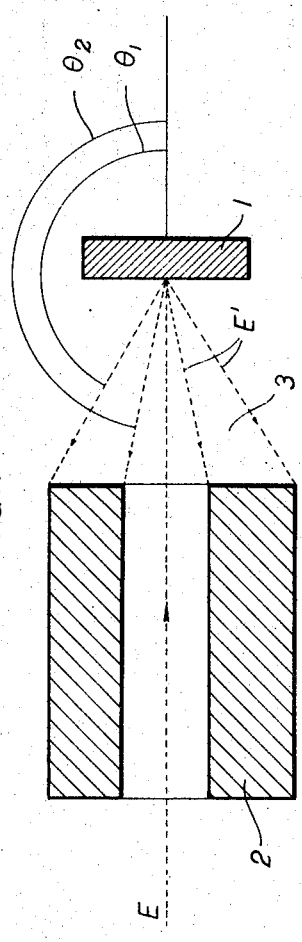
Figure 2:
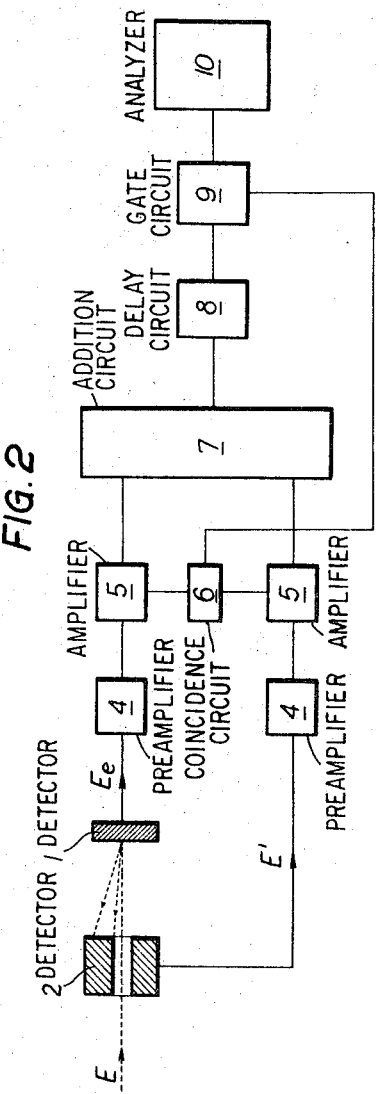

With these and other objects in view which will become apparent in the following detailed description, the present invention will be clearly understood in connection with the accompanying drawing, in which:

FIG. 1 is a schematic showing of the apparatus designed in accordance with the present invention disclosed in section; and FIG. 2 is a schematic diagram disclosing the apparatus.

Referring now to the drawing, in a spectrometer for the measuring of quantum, the relationship between the energy E of the primary quantum, of the scattering angle $\theta$ and of the energy E' of the scattered quantum can be exploited. From the energy-and impulse-ratio follows for an impact between a radiation quantum and a resting free electron the relation·

$$E' = \frac{E}{1 + \frac{E}{m_0 c^2}(1 - \cos\theta)}$$

By means of a detector 2 for the back scattering quantum, occurrences are selected and analyzed within a narrow range 3 near 180° in the detector 1 by means of a coincidence. The detector 1 registers the energy $E = E - E'$, which is transmitted to an electron by the scattering process. The spectrometer reacts to each primary energy with a single line.

In order to bring about a narrow line width, the difference of the angles must be small, whereby, however, the efficiency of the spectrometer is small. Due to the movement of the extra nuclear electrons in the atoms of the detector, the strong relation between E, E' and $\theta$ is extinguished, since the assumption of an impact between a quantum and a resting electron is not correct. Also the analyzed spectrum of the detector 1, $E_e = E - E'$, is not linearly dependent upon E and thus not exactly determinable. In the conventional spectrometers, the impulses of the detector 1 are analyzed, while the detector 2 merely serves to the selection of the timing.

It is now proposed in accordance with the present invention that the coincidence impulses of the detectors 1 and 2 are added, whereby the mentioned drawbacks disappear, since the following relation prevails:

$$E_e + E' = E = \text{constant} \neq f(\theta)$$

In this equation $E_e$ is the impulse on the detector 1, E' the impulse on the detector 2. For the low energy of the back scattered quantum the detector reacts nearly always with one line, which is caused by the complete absorption of the gamma quantum in the detector. Since the relationship does not depend anymore on $\theta$, now a large angular range is possible. The other drawback is removed, since by the electron movement only the distribution between $E_e$ and E' becomes not sharp, however the sum $E' + E_e = E = $ constant.

In FIG. 2 the arrangement in accordance with the present invention is shown schematically. The quantum E impinges upon the detector 1 and releases there an impulse $E_e$. The backscattering on the detector 1 impinges upon a detector 2 and releases there an impulse E'. Both detectors are semiconductor elements, for instance the detector 1 a Ge-or Si-semiconductor and the detector 2 a GE-semiconductor. The impulses formed at the detectors run over preamplifiers 4 and amplifiers 5 to an addition circuit 7, where its sum or a linear combination is formed.

Between the two amplifiers is disposed a coincidence circuit 6, which opens a gate 9. The sum formed in the addition circuit 7 is transmitted by means of a delay circuit 8 and the gate circuit 9 to a multichannel analyzer 10.

Semiconductor detectors have themselves a line width of for instance 2 k.e.v. half value width. Until now one could not get below a line width of for instance 8 k.e.v. with a Compton-spectrometer. By the use of a second detector of low line width and a high participation on the total efficiency, which corresponds on the basis of a complete absorption of the gamma quantum in the detector as well as by the addition of the impulse the value can fall much lower, for instance 3 k.e.v.

While I have disclosed one embodiment of the present invention, it is to be understood that this embodiment is given by example only and not in a limiting sense, the scope of the present invention being determined by the objects and the claims.

We claim:
1. An apparatus for measuring of quantum radiation, particularly of gamma radiation, comprising
   a first detector means for receiving the primary gamma radiation and for scattering said primary gamma radiation thereby producing backscattering radiation,
   a second detector means disposed in the range of said backscattering radiation for receiving the latter and for producing a second detector signal substantially proportional to the energy of said backscattering radiation,
   said first detector means producing a first detector substantially proportional to the energy of a primary gamma radiation minus the energy of the corresponding backscattering radiation,
   a coincidence circuit means operatively connected to both said detector means, and
   a measuring device,
   both said detector means having a high resolving power in spite of a complicated response function, and
   an adding device operatively connected to both said first and second detector means for adding said first and second detector signals and the output of said adding device being operatively connected with said measuring device and
   a gate means actuated by said coincidence circuit and connected between said adding device and said measuring device for passing the output of said adding device to said measuring device upon receiving a signal from said coincidence circuit.

2. The apparatus, as set forth in claim 1, wherein both said detector means are semiconductor detectors.